United States Patent [19]
Markusch et al.

[11] Patent Number: 6,165,550
[45] Date of Patent: Dec. 26, 2000

[54] SYMMETRICAL POLYUREA-URETHANE FERTILIZER ENCAPSULATION

[75] Inventors: Peter H. Markusch, McMurray; James W. Rosthauser, Pittsburgh, both of Pa.

[73] Assignee: Bayer Corporation, Pittsburgh, Pa.

[21] Appl. No.: 09/121,482

[22] Filed: Jul. 23, 1998

[51] Int. Cl.$^7$ ................................................ B05D 7/00
[52] U.S. Cl. ............................................. 427/221; 427/212
[58] Field of Search ................................ 427/212, 213, 427/214, 215, 221

[56] References Cited

U.S. PATENT DOCUMENTS

| | | | |
|---|---|---|---|
| 3,259,482 | 7/1966 | Hansen | 71/64 |
| 3,264,088 | 8/1966 | Hansen | 71/64 |
| 3,264,089 | 8/1966 | Hansen | 71/64 |
| 3,342,577 | 9/1967 | Blouin et al. | 71/64 |
| 3,475,154 | 10/1969 | Kato | 71/64 |
| 4,369,055 | 1/1983 | Fujita et al. | 71/64.11 |
| 4,711,659 | 12/1987 | Moore | 71/93 |
| 4,772,790 | 9/1988 | Kögler et al. | 427/212 |
| 4,804,403 | 2/1989 | Moore | 71/28 |
| 4,969,947 | 11/1990 | Moore | 71/28 |
| 5,176,734 | 1/1993 | Fujita et al. | 71/11 |
| 5,206,341 | 4/1993 | Ibat et al. | 528/361 |
| 5,219,465 | 6/1993 | Goertz et al. | 71/28 |
| 5,374,292 | 12/1994 | Detrick et al. | 71/28 |
| 5,538,531 | 7/1996 | Hudson et al. | 71/28 |
| 5,547,486 | 8/1996 | Detrick et al. | 71/28 |
| 5,599,374 | 2/1997 | Detrick | 71/28 |
| 5,704,062 | 1/1998 | Navascues | 71/64.07 |
| 5,851,261 | 12/1998 | Markusch et al. | 71/64.07 |

FOREIGN PATENT DOCUMENTS

| | | |
|---|---|---|
| 2135788 | 1/1995 | Canada . |
| 867422 | 9/1998 | European Pat. Off. . |
| 52-38361 | 3/1977 | Japan . |
| 3-146492 | 6/1991 | Japan . |
| 5-097561 | 4/1993 | Japan . |
| 2007095 | 5/1979 | United Kingdom . |

*Primary Examiner*—Timothy Meeks
*Assistant Examiner*—Paul D. Strain
*Attorney, Agent, or Firm*—Joseph C. Gil; N. Denise Brown

[57] ABSTRACT

This invention relates to processes for the production of symmetrical polyurea-urethane coated granular fertilizer products, and to the symmetrical polyurea-urethane coated granular fertilizer products produced by these processes. These processes comprise coating fertilizer granules with compounds which react to form urethane coatings which contain terminal isocyanate groups, followed by polymerization of these urethanes to form symmetrical polyurea-urethanes. Suitable compounds comprise a) an organic polyisocyanate component, and b) an alkanolamine component containing at least one tertiary amine group and at least one hydroxyl group. These compounds are present in sufficient quantities that the molar ratio of isocyanate groups to isocyanate-reactive groups is from about 1.6:1.0 up to about 10.0:1.0 in each encapsulating layer. It is necessary that sufficient amounts of these compounds are applied to the fertilizer granules such that the symmetrical polyurea-urethane coated granular fertilizer particles contain from about 0.5 to about 15% by weight of polyurea-urethane, based on the total weight of the encapsulated fertilizer particles.

21 Claims, No Drawings

SYMMETRICAL POLYUREA-URETHANE FERTILIZER ENCAPSULATION

BACKGROUND OF THE INVENTION

This invention relates to a process for producing symmetrical polyurea-urethane coated granular fertilizer particles and the coated granular fertilizer particles produced by this process. The polyurea-urethane coatings comprise a) a polyisocyanate, preferably an aromatic polyisocyanate, and most preferably a polymethylene poly(phenyl isocyanate) and b) an alkanolamine containing at least one tertiary amine group and at least one hydroxyl group, in the presence of moisture.

Commercial particulate fertilizers are produced and marketed in several different particle types, i.e., granular, pelletized, dusts, pilled, and prilled fertilizers. Also, they may be formed of inorganic substances, organic substances, or combinations thereof. The improvements of the present invention can be applied to any of these types of particulate fertilizers.

In order to be effective in promoting plant growth, fertilizers must contain some amount of water soluble plant nutrients. These are typically in the form of water soluble compounds of nitrogen, phosphorus and potassium, alone or in combination, and often in conjunction with other elements such as, for example, calcium, boron, magnesium, zinc, chlorine, etc. Such particulate fertilizers can be made of a single component, e.g., urea, ammonium nitrate, potassium chloride, etc., or of multiple components often mixed with inert water soluble or water insoluble materials as in common fertilizers designated as 6-6-6, 4-6-4, 10-10-10, 20-20-5, 14-16-0, 5-20-20, and the like. In addition, specialized fertilizers may contain optional additives such as herbicides, insecticides, trace elements, iron salts, sulfur, etc. The improvements of the present invention can be applied to any of these fertilizers.

Historically, particulate fertilizers possessed a number of known defects, the most notable being the too rapid release of soluble plant food, causing phytotoxicity and the rapid depletion of the plant nutrients by leaching. Other problems included tendencies to cake and form dust. These problems are well documented in previous patents that professed solutions to one or more of the known defects, including U.S. Pat. Nos. 3,475,154, 3,259,482, 3,264,088, 3,264,089, 4,711,659, 4,772,490 and Japanese Patent 52-38361. The present invention provides additional improvements in the construction of particulate fertilizers which render them highly attrition resistant and further extended release properties.

A number of slow release coatings for particular fertilizers have previously been proposed. The process of sulfur coating urea particles is described in U.S. Pat. No. 3,342,577 and was developed in the late 1960's by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then, imperfections remain in the coating, making it necessary to apply a sealant coating, which is composed of a mixture of 30% polyethylene resin in a 70% bright 20 stock mineral oil.

Attempts to seal the sulfur coating have been described in U.S. Pat. No. 5,219,465. Topcoats are formed on the sulfur layer using various polymers include a polyurethane based on polymethylene poly(phenyl-isocyanate) and polyester polyols. In this process, the addition of a catalyst is necessary to promote cure of the polyurethane on the surface.

U.S. Pat. No. 5,599,374 relates to a process for producing sulfur-coated slow release fertilizers which have improved impact and abrasion resistance properties. This process applies liquid monomers sequentially onto the surface of hot sulfur-coated urea granules, and copolymerizes these to form a firm, tack-free, water insoluble polymer coating sealant.

Suitable liquid monomers are diisocyanates such as diphenylmethane diisocyanate, and a polyol mixture of diethylene glycol (DEG) and triethanolamine (TEOA). TEOA serves both as a reactive polyol and as a catalyst. This patent attempts to overcome the deficiencies of using sulfur alone to achieve slow release properties. The polyurethane serves to coat and cover the areas of the fertilizer particle not covered by the sulfur, and thus, provide improved time release properties.

Coatings in which preformed polymer resins are applied from solvents have been described in, for example, U.S. Pat. Nos. 3,475,154 and 3,264,089. The use of solvents creates a vapor hazard as the products are dried and the solvent evaporation step can result in pinhole imperfections in the coatings when applied.

U.S. Pat. No. 4,369,055 tried to facilitate degradation of coating materials while maintaining the function for controlling the dissolving-out rate by dispersing inorganic powders such as sulfur and talc in a low molecular weight olefin polymer. However, the disclosed coating materials are difficult to apply in uniform layers because the polymers must be maintained in the molten state.

Polyurethane coatings as disclosed in U.S. Pat. Nos. 4,711,659 and 4,969,947 require that the substrate contains a minimum quantity of reactive —$NH_2$ groups. Thus, these are not applicable to all fertilizer compositions for which slow release properties may be desirable.

Coating of fertilizer compositions with a biodegradable polymer was described in U.S. Pat. Nos. 5,176,734 and 5,206,341 and Japanese Patent Application No. 146492/1991. These references disclose coating the fertilizer composition with a biodegradable coating material in a single layer. The single layer coating has difficulties controlling the dissolving-out rate of fertilizer nutrients while maintaining biodegradability simultaneously.

Japanese Patent Application No. 9756111993 discloses a three layer coating which was prepared by using one type of biodegradable film and a water soluble resin. This coating also has difficulty in controlling both the dissolving-out rate and the biodegradability at the same time. The thickness of the coating material is disclosed as being from 500 to 2,000 µm. Such a coating material requires increased cost, thus making it questionable for commercial use.

Canadian Patent Application No. 2,135,788 relates to coating fertilizer compositions with at least two types of coating materials wherein the two coating materials have different dissolving-out rates and moisture permeability in a multi-layer structure.

U.S. Pat. No. 5,538,531 also describes controlled release fertilizers and a method for their production. These controlled release fertilizers have a central mass of particulate fertilizer which contains at least one water soluble plant nutrient surrounded by a plurality of coatings. The inner coating comprises the reaction product of (A) an aromatic polyisocyanate or derivatives thereof which contain about 1.5 to 3 NCO groups per molecule and an NCO group content of 10 to 50% by weight, and (B) a polyol having from 2 to 6 hydroxyl moieties and at least one alkyl moiety containing from about 10 to 22 carbon atoms. An outer coating is also necessary. The outer coating consists essentially of an organic wax having a drop melting point of between 50 and 120° C.

U.S. Pat. No. 5,704,962 describes compositions for treating granular fertilizers to reduce dust and reduce caking of the fertilizers during storage. These compositions comprise fatty monoamines, specifically fatty secondary dialkylamines or mixtures thereof with fatty primary amines. Advantages of the present invention include the fact that improved overall fertilizer release properties result at a given percentage organic encapsulant. Furthermore, the present invention does not require an isocyanate-reactive central mass so that any sequence of application of the isocyanate and the isocyanate-reactive components can be used. The present invention also allows to mix the isocyanate and the isocyanate-reactive components prior to applying them onto the fertilizer surface. Finally, by incorporating a moisture curing catalyst into the curing mass, odors that can be attributed to the amine catalysts are significantly reduced.

SUMMARY OF THE INVENTION

This invention relates to a process for producing symmetrical polyurea-urethane coated granular fertilizer particles, and the coated granular fertilizer particles produced by this process. The polyurea-urethane-urea coatings comprise a) at least one polyisocyanate, preferably an aromatic polyisocyanate, more preferably a polymethylene poly(phenyl isocyanate), and b) at least one alkanolamine corresponding to the general formula:

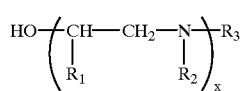
(I)

wherein:

R$_1$: represents a hydrogen atom, or a C$_1$ to C$_4$ alkyl group;

R$_2$ and R$_3$: may be the same or different and each represents a C$_1$ to C$_4$ alkyl group or a

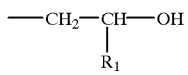

group, wherein:

R$_1$ is defined as above;

or R$_2$ and R$_3$ are joined together in a ring, thereby forming a 3 to 8 membered cyclic ring; and x: represents a number from 1 to 4.

The process of producing symmetrical polyurea-urethane coated granular fertilizer particles of the present invention comprises the steps of 1) coating fertilizer particles with a first compound followed by coating with a second compound, the first and second compounds being capable of reacting to form a urethane containing terminal isocyanate groups, and 2) polymerizing the urethane adduct from 1) with moisture on the surface of the fertilizer particles to form a symmetrical polyurea-urethane sealant coating that imparts slow release properties to the fertilizer.

Suitable compounds comprise a) at least one organic polyisocyanate, preferably an aromatic polyisocyanate, most preferably a polymethylene poly(phenyl isocyanate), and b) at least one alkanolamine which corresponds to formula (I). The quantities of components a) and b) used to form each layer of polyurea-urethane should be such that the NCO:H ratio is from about 1.6:1 to about 10:1, preferably 2.0:1 to 10:1, more preferably 2:1 to 8:1, and most preferably 4:1 to 8:1. These compounds are applied in sufficient amounts such that the symmetrical polyurea-urethane coated granular fertilizer particles contain from about 0.5 to about 15%, preferably 1 to 10%, most preferably 3 to 7% by weight of polyurea-urethane, based on the total weight of the encapsulated fertilizer particles.

In the present invention, the ratios of NCO:H as set forth herein is defined as the relative molar amounts of isocyanate groups to isocyanate-reactive groups necessary to form one layer of symmetrical polyurea-urethane, or polyurea, polyurethane, etc. The percent by weight of encapsulating material is based on the weight of the fertilizer particles, as well as the combined weight of all layers of encapsulating materials.

In one embodiment of the present invention, the process comprises:

1) applying a) at least one organic polyisocyanate, preferably an aromatic polyisocyanate, more preferably polymethylene poly(phenyl isocyanate) to fertilizer particles containing at least one water soluble plant nutrient, to form isocyanate-coated fertilizer particles, 2) applying b) at least one alkanolamine compound which corresponds to formula (I) above onto the isocyanate-coated fertilizer particles from step 1) to yield a urethane encapsulated fertilizer particles, wherein the urethane contains terminal isocyanate groups, 3) polymerizing the urethane adduct from 2) with moisture to form a symmetrical polyurea-urethane sealant coating, and, optionally, 4) repeating steps 1) through 3) as many times as necessary, with the polyurea-urethane encapsulated fertilizer particles from step 3) being substituted for the fertilizer particles in step 1) above.

In this embodiment, the total quantities of components a) and b) are such that the NCO:H ratio in each encapsulation layer is from about 1.6:1 up to about 10:1, preferably 2.0:1 to 10:1, more preferably 2:1 to 8:1, and most preferably 4:1 to 8:1. These compounds are applied in sufficient amounts such that the symmetrical polyurea-urethane coated granular fertilizer particles contain from about 0.5 to about 15% by weight, preferably 1 to 10%, most preferably 3 to 7% by weight of polyurea-urethane, based on the total weight of the encapsulated fertilizer particles.

In another embodiment of the present invention, the process comprises:

1) applying b) at least one alkanolamine compound which corresponds to formula (I) above to fertilizer particles containing at least one water soluble plant nutrient, to form alkanolamine-coated fertilizer particles, 2) applying a) an organic polyisocyanate, preferably an aromatic polyisocyanate, more preferably polymethylene poly(phenyl isocyanate) onto the alkanolamine-coated fertilizer particles from step 1) to yield urethane encapsulated fertilizer particles, wherein the urethane contains terminal isocyanate groups, 3) polymerizing the urethane adduct from 2) with moisture to form a symmetrical polyurea-urethane sealant coating, and, optionally, 4) repeating steps 1) through 3) as many times as necessary to form the desired thickness of the symmetrical polyurea-urethane coating which encapsulates the fertilizer particles, with the symmetrical polyurea-urethane encapsulated fertilizer particles from step 3) being substituted for the fertilizer particles in step 1) above.

In this embodiment, the total quantities of components a) and b) are such that the NCO:H ratio present in each encapsulation layer is from about 1.6:1 up to about 10:1, preferably 2.0:1 to 10:1, more preferably 2:1 to 8:1, and most preferably 4:1 to 8:1. These compounds are applied in sufficient amounts such that the symmetrical polyurea-urethane coated granular fertilizer particles contain from about 0.5 to about 15% by weight, preferably 1 to 10%, most preferably 3 to 7% by weight of polyurea-urethane, based on the total weight of the encapsulated fertilizer particles.

DETAILED DESCRIPTION OF THE INVENTION

In the present invention, the term symmetrical with respect to the polyurea-urethanes refers to the fact that the residual groups which are attached to the urea group are the same as each other while in unsymmetrical polyurea-urethanes these residual groups are different. This is due to the fact that the urea portion arises from reaction of the isocyanate with the amines which are generated by the reaction of a portion of the isocyanate with water.

As used herein, the term molecular weight refers to the number average molecular weight ($M_n$), and is determined by end group analysis.

Examples of suitable polyisocyanates which may be used as the polyisocyanate component in accordance with the present invention include monomeric diisocyanates, preferably NCO prepolymers and more preferably polyisocyanate adducts. Suitable monomeric diisocyanates may be represented by the formula $$R(NCO)_2$$

in which R represents an organic group obtained by removing the isocyanate groups from an organic diisocyanate having a molecular weight of about 56 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl)methane, 2,4'-dicyclohexylmethane diisocyanate, 1,3- and 1,4-bis (isocyanatomethyl) cyclohexane, bis(4-isocyanato-3-methylcyclohexyl) methane, α,α,α', α'-tetramethyl-1,3- and/or -1,4-xylylene diisocyanate, 1-isocyanato-1-methyl4 (3)-isocyanatomethyl cyclohexane, 2,4- and/or 2,6- hexahydrotoluene diisocyanate, 1,3- and/or 1,4-phenylene diisocyanate, 2,4- and/or 2,6-toluene diisocyanate, 2,4'- and/ or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polymethylene poly (phenylisocyanates) obtained by phosgenating aniline/ formaldehyde condensates may also be used.

In accordance with the present invention, at least a portion of the polyisocyanate component may be present in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220, 749 by using co-reactants such as water, tertiary alcohols, primary and secondary monoamines, and primary and/or secondary diamines. These polyisocyanates preferably have an NCO content of 18 to 22% by weight and an average NCO functionality of 3to3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552, 350.

8) Polyisocyanates containing oxadiazinetrione groups and containing the reaction product of two moles of a diisocyanate and one mole of carbon dioxide.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 5,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates for the present invention are aromatic polyisocyanates. Some examples of suitable aromatic polyisocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polymethylene poly(phenylisocyanates) obtained by phosgenating aniline/formaldehyde condensates may also be used.

It is more preferred that the polyisocyanates for the presently claimed invention are polymethylene poly(phenylisocyanate) compositions having a functionality of from about 2.1 to about 3.5, preferably 2.2 to 3.2 and most preferably of 2.3 to 2.8, and an NCO group content of about 26% to about 33.6%, preferably about 30.5% to about 33%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the composition. The polymeric MDI content of these isocyanates varies from about 10 to about 70% by weight, preferably from about 20% to about 60% by weight.

Polymeric MDI as used herein, refers to three-ring and/or higher ring containing products derived by the phosgenation of aniline-formaldehyde condensation products.

Most preferred polyisocyanates include, for example, polymethylene poly(phenylisocyanate) compositions having an average functionality of from about 2.2 to about 3.2, preferably about 2.3 to about 2.8, an NCO group content of about 26 to 33% by weight, and a monomer content of from about 40 to about 80% by weight, wherein the content of monomer comprises no more than about 3% by weight of the 2,2'-isomer, from about 2 to about 25% by weight of the 2,4'-isomer and from about 35 to about 60% by weight of the 4,4'-isomer, based on the entire weight of the blend. This isocyanate composition comprises from about 20 to about 60% by weight of polymeric MDI.

Also suitable are mixtures of polyisocyanate compositions as described above with adducts of MDI including, for example, allophanates of MDI as described in, for example, U.S. Pat. Nos. 5,319,053, 5,319,054 and 5,440,003, the disclosures of which are herein incorporated by reference; urethanes of MDI as described in, for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Suitable alkanolamines for the present invention include those alkanolamines which correspond to the general formula:

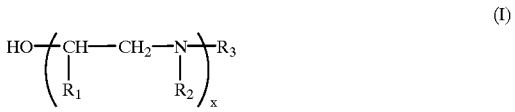

wherein:
$R_1$: represents a hydrogen atom, or a $C_1$ to $C_4$ alkyl group;
$R_2$ and $R_3$: may be the same or different and each represents a $C_1$ to $C_4$ alkyl group or a

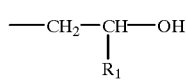

group, wherein:
$R_1$ is defined as above;
or $R_2$ and $R_3$ are joined together in a ring, thereby forming a 3 to 8 membered cyclic ring; and
x: represents a number from 1 to 4.

In general, these alkanolamines have molecular weights of from about 89 to about 360, more preferably from about 89 to about 260, and most preferably from about 89 to about 160. It is also preferred that these alkanolamines contain from 1 to 4 tertiary amine groups and from 1 to 6 hydroxyl groups, more preferably from 1 to 2 tertiary amine groups and from 1 to 4 hydroxyl groups, and most preferably 1 tertiary amine group and from 1 to 3 hydroxyl groups.

In accordance with the present invention, it is possible that a mixture of two or more alkanolamines corresponding to formula (I) above may be used. To reduce processing time, a mixture of one alkanolamine corresponding to formula (I) above with at least one polyamine which is capable of reacting with isocyanate groups can be used. This combination would result in a mixture of symmetrical and unsymmetrical polyurea-urethanes. Virtually any mixture containing at least one alkanolamine corresponding to formula (I) above can be used in the present invention, with the following provisos: (i) that alkanolamines which contain primary and/or secondary amine groups are preferably not present, and (ii) that diethylene glycol is preferably not present. In fact, it is preferred that the alkanolamines corresponding to formula (I) of the present invention are not mixed with or used in conjunction with any other isocyanate-reactive component which contains hydroxyl groups.

Examples of suitable alkanolamines to be used in the present invention include but are not limited to compounds such as N-methyl-diethanolamine, N,N-dimethylethanolamine, triethanolamine, N,N-diethylethanolamine, N,N,N',N'-tetraethanol ethylenediamine, N',N'-dimethyl-N,N-diethanol ethylenediamine, N-ethanol-piperidine, N-ethanol-pyrolidine, N-ethanol-morpholine, etc. Preferred alkanolamines include N,N-dimethylethanolamine, N-methyldiethanolamine, and triethanolamine.

It is also possible to include other additives in either the isocyanate-reactive component or the polyisocyanate component prior to applying the component to the fertilizer particles. Possible additives include, for example, catalysts, preferably ones that are not toxic and do not contain heavy metals, flow aids, surfactants, defoamers and other additives known to those skilled in the art. Any additive which aids the formation of the symmetrical polyurea-urethane coating which encapsulates the fertilizer particles may be included in one or both of these components. It is, however, preferred that no additional catalysts are included in either of the two components. It is most preferred that heavy metal catalysts are not used in the process of the present invention.

Suitable fertilizer particles for the present encapsulation process include any of the known chemical fertilizers. Some examples are ammonium sulfate, ammonium nitrate, urea, guanidine, melamine, sodium nitrate, ammonia phosphate, potassium phosphate, and combinations thereof. These fertilizer particles are obviously water soluble. In the present application, it is not necessary, but, however, acceptable, for the fertilizer particles to contain some reactive functional groups such as, for example, $NH_2$ groups.

As used herein, the phrase "fertilizer particles" refers to any of the commercially available particulate fertilizers which are produced and marketed in various particle types. Some examples include granular, pelletized, dusts, pilled and prilled fertilizers.

An attrition resistant, controlled release particulate fertilizer may be prepared by applying the isocyanate-reactive component and the polyisocyanate to fertilizer particles which are heated to a temperature of between about 60 and 105° C. The fertilizer particles are kept in continuous low shear, low impact, motion relative to each other by mixing apparatus. Examples of suitable mixing apparatus include fluidized bed, rotating drum, pan pelletizer, and any others which can provide a continuous, low shear motion of the fertilizer particles.

More specifically, attrition resistant, controlled release fertilizers may be produced by (i) providing a quantity of fertilizer particles and heating them to a temperature above no higher than about 120° C., (ii) agitating the fertilizer particles such that a gentle mixing thereof is maintained, (iii) adding to the agitated fertilizer particles, an isocyanate-reactive component comprising at least one alkanolamine compound which corresponds to formula (I), (iv) after the isocyanate-reactive component has spread uniformly, adding to the agitated fertilizer particles a polyisocyanate component, in an amount such that the ratio of NCO groups to isocyanate-reactive groups is from about 1.6:1.0 up to about 10.0:1.0, preferably 2.0:1 to 10.0:1.0, more preferably 2:1.0 to 8:1.0, and most preferably 4:1 to 8:1, (v) allowing the polyisocyanate and the isocyanate-reactive materials to react, thus forming a solidified symmetrical polyurea-urethane coating on the fertilizer particles, and (vi) cooling the coated fertilizer particles to about or slightly above room temperature, with continuous agitation.

Metering of the streams of the polyisocyanate component and the isocyanate-reactive component onto the fertilizer particles can be continuous. It may be, however, advantageously discontinuous, when only a portion of the total amount of each of the two reactants is added and allowed to react prior to applying additional portions.

Successful application of the coatings of the present invention to particulate fertilizers depends on factors such as i) fairly precise temperature control, ii) continuous non-shear movement of fertilizer particles during application of the optionally successive urethane coatings, and iii) followed by cooling. It is very important to maintain movement of the particles to assure continuous coatings and to avoid agglomeration of the fertilizer particles.

It is not necessary for the fertilizer particles to contain reactive groups for adhesion of the coating material, and only a very minute portion of the reactive groups in the fertilizer particles containing them are actually exposed on the surface, and these reactive groups are in a solid phase which does not readily react with the liquid isocyanate component.

It is possible that many different kinds of techniques and compositions can be used in encapsulating fertilizer particles. In the spirit of this invention, it is necessary that at least one layer comprises the symmetrical polyurea-urethane of the present invention. Other suitable compositions for forming layers of encapsulating materials include, for example, those compositions as described in copending U.S. Pat. No. 5,851,261 and U.S. application Ser. No. 08/777,427 filed on Dec. 30, 1996, both of which are commonly assigned, and U.S. Pat. No. 6,001,147, applicants copending U.S. application Ser. No. 09/121,376, now U.S. filed in the United States Patent and Trademark Office on the same day as the present application, i.e. Jul. 23, 1998. This embodiment may also result in other similar encapsulated fertilizer particles wherein the composition of the encapsulating compounds used to form layers on the fertilizer particles varies. Suitable encapsulating compounds comprise symmetrical polyurea-urethanes of the present invention, with other layers being selected from polyureas, polyurethanes, unsymmetrical polyurea-urethanes, etc.

In the present invention, it is preferred that polymeric coatings formed by the copolymerization of diethylene glycol-triethanolamine polyol and a diisocyanate are not used and, in fact, are preferably absent in the process of forming compositions of encapsulating layers of the present invention. However, in order to improve the attrition resistance of the encapsulated fertilizer particles, it is possible to increase the flexibility of the polymeric coatings by incorporating higher molecular weight polyols, preferably polyether polyols, known to those skilled in the art.

The following examples further illustrate details for the processes and products of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the examples.
Isocyanate A:
   a polymethylene poly(phenylisocyanate) containing 64% diphenylmethane diisocyanate monomers and 36% of higher functionality homologs, and having an overall isocyanate group content of about 32.3% and a functionality of 2.3.
Isocyanate B:
   a urethane modified polymethylene poly (phenylisocyanate) blend having an average functionality of about 2.4 and an average NCO group content of about 27%. This blend was prepared by mixing equal amounts of (i) a polymethylene poly(phenylisocyanate) containing 43% diphenylmethane diisocyanate monomers, and 57% of higher functionality homologs, and having an overall isocyanate group content of about 32.0% and a functionality of 2.7 to 2.8; and (ii) a 182 equivalent weight prepolymer prepared by reacting 4,4'-diphenylmethane diisocyanate with a technical grade of tripropylene glycol to an NCO content of 23%.

Example 1

Comparative Example

N-methyldiethanolamine (0.73 g) was added to 100 g of Agway 5-10-10 fertilizer pellets in an 8 ounce bottle. The bottle was shaken until the N-methyldiethanolamine was coated on the pellets (about 2 to 3 minutes). Isocyanate A (1.6 g) was added to the alkanolamine coated pellets, the bottle was shaken until the isocyanate coated the alkanolmine-coated fertilizer pellets (about 5 minutes). This mixture was poured into an aluminum pan and placed into a 110° C. oven (the pellets were mixed 2 to 3 times while in the oven to prevent the pellets from sticking together) until they were dry and no longer stuck together (about 10 minutes). This procedure of coating and heating the pellets was repeated two more times using the same amounts of alkanolamine and isocyanate. Theoretically, this process would result in about 6.53% polyurea-urethane encapsulation on the pellets, based on the total weight of the encapsulated fertilizer particles. However, the actual amount of polyurea-urethane encapsulation was about 5.9% due to the loss of coating on the walls of the bottle.

Example 2

Comparative Example

Triethanolamine (0.63 g) was added to 100 g of Agway 5-10-10 fertilizer pellets in an 8 ounce bottle. The bottle was shaken until the triethanolamine was coated on the pellets (about 2 to 3 minutes). Isocyanate A (1.65 g) was added to the alkanolamine coated pellets, the bottle was shaken until the isocyanate coated the alkanolamine-coated fertilizer pellets (about 5 minutes). This mixture was poured into an aluminum pan and placed into a 110° C. oven (the pellets were mixed 2 to 3 times while in the oven to prevent the pellets from sticking together) until they were dry and no longer stuck together (about 10 minutes). This procedure of coating and heating the pellets was repeated two more times using the same amounts of alkanolamine and isocyanate. After the third coating, the coated pellets were left in the oven for 112 hour at 110° C. Theoretically, this would result in about 6.4% polyurethane encapsulation, based on the total weight of the encapsulated fertilizer particles. However, the actual amount of polyurea-urethane encapsulation was about 5.8% due to the loss of coating on the walls of the bottle.

Example 3

Isocyanate A (2.29 g) was added to 100 g of Agway 5-10-10 fertilizer pellets in an 8 ounce bottle. The bottle was shaken until the isocyanate was coated on the pellets (about 2 to 3 minutes). N-methyldiethanolamine (0.26 g) was added to the isocyanate coated pellets, the bottle was shaken until the alkanolamine coated the isocyanate-coated fertilizer pellets (about 2 to 3 minutes). This mixture was poured into an aluminum pan, and allowed to cure at room temperature (the pellets were mixed while in the pan to prevent the pellets from sticking together) until they were dry and no longer stuck together (about 30 to 60 minutes). This procedure of coating and heating the pellets was repeated two more times using the same amounts of alkanolamine and isocyanate. After the last coat, the pellets were left in the pan over night to cure. Theoretically, this would result in about 7.11% polyurea-urethane encapsulation, based on the total weight of the encapsulated fertilizer particles. However, the actual amount of polyurea-urethane encapsulation was about 6.5% due to the loss of coating on the walls of the bottle.

Example 4

Dimethylethanolamine (0.60 g) was added to 100 g of Agway 5-10-10 fertilizer pellets in an 8 ounce bottle. The bottle was shaken until the dimethylethanolamine was coated on the pellets (about 2 to 3 minutes). Isocyanate A (1.76) was added to the alkanolamine coated pellets, the bottle was shaken at room temperature until the isocyanate coated the alkanolamine-coated fertilizer pellets and the pellets were dry and no longer stuck together (about 5 minutes). This procedure was repeated two more times using the same amounts of alkanolamine and isocyanate. After 5 minutes, the third coating was not dry, so the pellets were poured into an aluminum pan at room temperature until the pellets were dry (about 1 minute). Theoretically, this would result in about 6.61% polyurea-urethane encapsulation, based on the total weight of the encapsulated fertilizer particles. However, the actual amount of polyurea-urethane encapsulation was about 6.0% due to the loss of coating on the walls of the bottle.

Example 5

Isocyanate A (2.0 g) was added to 100 g of Agway 5-10-10 fertilizer pellets in an 8 ounce bottle. The bottle was shaken until the isocyanate was coated on the pellets (about 2 to 3 minutes). Dimethylethanolamine (0.34 g) was added to the isocyanate coated pellets, the bottle was shaken until the alkanolamine coated the isocyanate-coated fertilizer pellets (about 2 to 3 minutes). This mixture was poured into an aluminum pan and allowed to cure at room temperature (the pellets were mixed periodically while in the pan to prevent the pellets from sticking together) until they were dry and no longer stuck together (about 3 minutes). This procedure of coating and curing was repeated two more times using the same amounts of alkanolamine and isocyanate. After the last coat, the pellets were left in the pan over night to cure. Theoretically, this would result in about 6.56% polyurea-urethane encapsulation, based on the total weight of the encapsulated fertilizer particles. However, the actual amount of polyurea-urethane encapsulation was about 5.9% due to the loss of coating on the walls of the bottle.

Example 6

Isocyanate A (2.0 g) was added to 100 g of Harvest King 5-10-10 fertilizer pellets in an 8 ounce bottle. The bottle was shaken until the isocyanate was coated on the pellets (about 2 minutes). Dimethylethanolamine (0.17 g) was added to the isocyanate-coated pellets, and the bottle was shaken until the alkanolamine coated the isocyanate-coated fertilizer pellets (about 2 minutes). This mixture was poured into an aluminum pan and allowed to cure at room temperature (the pellets were mixed periodically while in the pan to prevent the pellets from sticking together) until they were dry and no longer stuck together (about 3 minutes). This procedure of coating and mixing/curing at room temperature was repeated two more times using the same amounts of alkanolamine and isocyanate. The last coat was left in the pan over night to cure. Theoretically, this would result in about 6.11% polyurea-urethane encapsulation, based on the total weight of the encapsulated fertilizer particles. However, the actual amount of polyurea-urethane encapsulation was about 5.5% due to the loss of coating on the walls of the bottle.

Example 7

Isocyanate B (2.0 g) was added to 100 g of Harvest King 5-10-10 fertilizer pellets in an 8 ounce bottle. The bottle was shaken until the isocyanate was coated on the pellets (about 2 minutes). Dimethylethanolamine (0.17 g) was added to the isocyanate-coated pellets, and the bottle was shaken until the alkanolamine coated the isocyanate-coated fertilizer pellets (about 2 minutes). This mixture was poured into an aluminum pan, and allowed to cure at room temperature (the pellets were mixed periodically while in the pan to prevent the pellets from sticking together) until they were dry and no longer stuck together (about 3 minutes). This procedure of coating and mixing/curing at room temperature was repeated two more times using the same amounts of alkanolamine and isocyanate. The last coat was left in the pan over night to cure. Theoretically, this would result in about 6.05% polyurea-urethane encapsulation, based on the total weight of the encapsulated fertilizer particles. However, the actual amount of polyurea-urethane encapsulation was about 5.4% due to the loss of coating on the walls of the bottle.

Test procedure for slow release properties:

After one week, the encapsulated fertilizer granules were compared to unmodified fertilizer using the following test procedure: 20 g of the fertilizer were combined with 80 g of water and stored at room temperature in a closed glass jar for 8 hrs and 20 hrs. After this time, the solids were filtered off and the amount of solids dissolved in the aqueous phase was determined after evaporation of the water for 4 hrs in a 100° C. oven.

TABLE 1

SLOW RELEASE PROPERTIES

| Example | % Fertilizer Dissolved After 8 Hrs. | 8 Hr. Comp. % Modified/ Unmodified | % Fertilizer Dissolved After 20 Hrs. | 20 Hr. Comp. % Modified/ Unmodified |
|---|---|---|---|---|
| Unmodified Agway Fertilizer | 30.7[1] | — | 33.2[2] | — |
| Example 1[3] | 18.0 | 58.6 | 27.9 | 84.0 |
| Example 2[3] | 16.8 | 54.7 | 25.1 | 75.6 |
| Example 3 | 10.8 | 35.2 | 18.2 | 54.8 |
| Example 4 | 19.0 | 61.9 | 23.6 | 71.1 |
| Example 5 | 15.4 | 50.2 | 22.6 | 68.1 |

[1]average of two (2) runs
[2]average of three (3) runs
[3]comparative example

TABLE 2

| Example | % Fertilizer Dissolved After 8 Hrs. | 8 Hr. Comp. % Modified/ Unmodified | % Fertilizer Dissolved After 20 Hrs. | 20 Hr. Comp. % Modified/ Unmodified |
|---|---|---|---|---|
| Unmodified Harvest King Fertilizer | 28.0 | — | 29.2 | — |
| Example 6 | 12.1 | 43.2 | 17.1 | 58.6 |
| Example 7 | 17.1 | 61.1 | 21.4 | 73.3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of symmetrical polyurea-urethane coated granular fertilizer particles comprising the steps of:
   coating fertilizer particles with a first compound followed by coating with a second compound, said first and second compounds being capable of reacting to form a urethane containing terminal isocyanate groups,
   2) polymerizing the urethane adduct from 1) with moisture on the surface of said fertilizer particles to form a symmetrical polyurea-urethane sealant coating that imparts slow release properties to the fertilizer,
   wherein said compounds comprise a) at least one organic polyisocyanate,

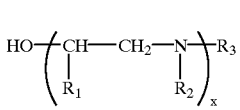

(I)

wherein:
   $R_1$: represents a hydrogen atom, or a $C_1$ to $C_4$ alkyl group;
   $R_2$ and $R_3$: may be the same or different, and each represents a $C_1$ to $C_4$ alkyl group, a

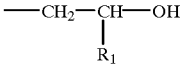

group, wherein:
   $R_1$: is defined as above;
   or $R_2$ and $R_3$ are joined together in a ring, thereby forming a 3 to 8 membered cyclic ring; and
   x: represents a number from 1 to 4,
   with the quantities of a) and b) being such that the NCO:H ratio in each encapsulating layer is from about 1.6:1 up to about 10:1,
and wherein the resultant symmetrical polyurea-urethane coated granular fertilizer particles contain from about 0.5 to about 15% by weight of polyurea-urethane, based on the total weight of the encapsulated fertilizer particles.

2. The process of claim 1, wherein a) said organic polyisocyanate comprises an aromatic polyisocyanate.

3. The process of claim 2, wherein a) said organic polyisocyanate comprises polymethylene poly (phenylisocyanate).

4. The process of claim 3, wherein the polymethylene poly(phenylisocyanate) has a functionality of from about 2.1 to 3.5, an NCO group content of about 26% to about 33.6%, a polymeric MDI content of about 10 to 70% by weight and a monomer content of about 30 to 90% by weight.

5. The process of claim 3, wherein the polymethylene poly(phenylisocyanate) has a functionality of from 2.3 to 2.8, an NCO group content of about 26% to about 33%, a polymeric MDI content of about 20% to about 60% by weight and a monomer content of about 40 to 80% by weight.

6. The process of claim 1, wherein said alkanolamines have molecular weights of from about 90 to about 260, and contain from 1 to 2 tertiary amine groups and from 1 to 4 hydroxyl groups.

7. The process of claim 1, wherein said alkanolamine is selected from the group consisting of dimethylethanolamine, N-methyldiethanolamine, triethanolamine and mixtures thereof.

8. A process for the preparation of symmetrical polyurea-urethane coated granular fertilizer particles comprising:
   1) applying a) an organic polyisocyanate component to fertilizer particles containing at least one water soluble plant nutrient, to form isocyanate-coated fertilizer particles,
   2) applying b) at least one alkanolamine compound which corresponds to the formula:

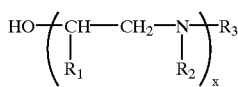
(I)

wherein:
R$_1$: represents a hydrogen atom, or a C$_1$ to C4 alkyl group;
R$_2$ and R$_3$: may be the same or different, and each represents a C$_1$ to C$_4$ alkyl group or a

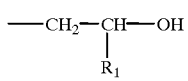

group, wherein:
R$_1$: is defined as above;
or R$_2$ and R$_3$ are joined together in a ring, thereby forming a 3 to 8 membered cyclic ring; and
x: represents a number from 1 to 4;
onto the isocyanate-coated fertilizer particles from step 1) to yield a rethane containing terminal isocyanate groups,
3) polymerizing the urethane adduct from 2) with moisture to yield symmetrical polyurea-urethane encapsulated fertilizer particles, with the quantities of components a) and b) being such that the NCO:H ratio in each encapsulating layer is from about 1.6:1 up to about 10:1,
and, optionally,
4) repeating steps 1) through 3) as many times as necessary, wherein the symmetrical polyurea-urethane encapsulated fertilizer particles from step 3) are substituted for the fertilizer particles in step 1) above,
wherein the resultant encapsulated fertilizer particles contain from about 0.5 to about 15% by weight of polyurea-urethane, based on the total weight of the encapsulated fertilizer particles.

9. The process of claim 8, wherein a) said organic polyisocyanate comprises an aromatic polyisocyanate.

10. The process of claim 9, wherein a) said organic polyisocyanate comprises polymethylene poly (phenylisocyanate).

11. The process of claim 10, wherein the polymethylene poly(phenylisocyanate) has a functionality of from about 2.1 to 3.5, an NCO group content of about 26% to about 33.6%, a polymeric MDI content of about 10 to 70% by weight and a monomer content of about 30 to 90% by weight.

12. The process of claim 10, wherein the polymethylene poly(phenylisocyanate) has a functionality of from 2.3 to 2.8, an NCO group content of about 26% to about 33%, a polymeric MDI content of about 20% to about 60% by weight and a monomer content of about 40 to 80% by weight.

13. The process of claim 8, wherein said alkanotamines have molecular weights of from about 90 to about 260, and contain from 1 to 2 tertiary amine groups and from 1 to 4 hydroxyl groups.

14. The process of claim 8, wherein said alkanolamine is selected from the group consisting of dimethylethanolamine, N-methyldiethanolamine, triethanolamine and mixtures thereof.

15. A process for the preparation of symmetrical polyurea-urethane coated fertilizer particles comprising:
1) applying b) at least one alkanolamine compound which corresponds to the formula:

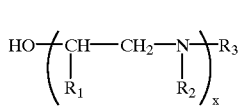
(I)

wherein:
R$_1$: represents a hydrogen atom, or a C$_1$ to C$_4$ alkyl group;
R$_2$ and R$_3$: may be the same or different, and each represents a C$_1$ to C$_4$ alkyl group or a

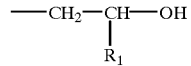

group, wherein:
R$_1$: is defined as above;
or R$_2$ and R$_3$ are joined together in a ring, thereby forming a 3 to 8 membered cyclic ring; and
x: represents a number from 1 to 4;
onto fertilizer particles containing at least one water soluble plant nutrient, to form alkanolamine-coated fertilizer particles,
2) applying a) an organic polyisocyanate component onto the alkanolamine-coated fertilizer particles from step 1) to yield a urethane containing terminal isocyanate groups,
3) polymerizing the urethane adduct from 2) with moisture to yield symmetrical polyurea-urethane encapsulated fertilizer particles, with the quantities of components a) and b) being such that the NCO:H ratio in each encapsulating layer is from about 1.6:1 up to about 10:1,
and, optionally,
4) repeating steps 1) through 3) as many times as necessary, wherein the symmetrical polyurea-urethane encapsulated fertilizer particles from step 3) are substituted for the fertilizer particles in step 1) above,
wherein the resultant encapsulated fertilizer particles contain from about 0.5 to about 15% by weight of polyurea-urethane, based on the total weight of the encapsulated fertilizer particles.

16. The process of claim 15, wherein a) said organic polyisocyanate comprises an aromatic polyisocyanate.

17. The process of claim 16, wherein a) said organic polyisocyanate comprises polymethylene poly (phenylisocyanate).

18. The process of claim 17, wherein the polymethylene poly(phenylisocyanate) has a functionality of from about 2.1 to 3.5, an NCO group content of about 26% to about 33.6%, a polymeric MDI content of about 10 to 70% by weight and a monomer content of about 30 to 90% by weight.

19. The process of claim 17, wherein the polymethylene poly(phenylisocyanate) has a functionality of from 2.3 to 2.8, an NCO group content of about 26% to about 33%, a polymeric MDI content of about 20% to about 60% by weight and a monomer content of about 40 to 80% by weight.

20. The process of claim 15, wherein said alkanolamines have molecular weights of from about 90 to about 260, and contain from 1 to 2 tertiary amine groups and from 1 to 4 hydroxyl groups.

21. The process of claim 15, wherein said alkanolamine is selected from the group consisting of dimethylethanolamine, N-methyldiethanolamine, triethanolamine and mixtures thereof.

* * * * *